April 2, 1935.  E. GALT  1,996,288
IDENTIFICATION DEVICE
Filed Sept. 15, 1932
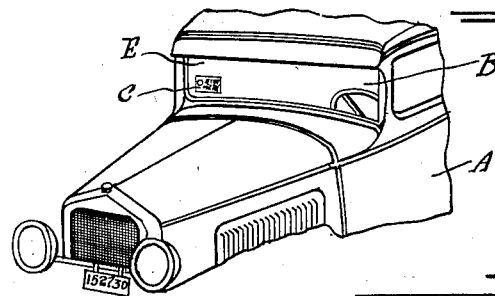
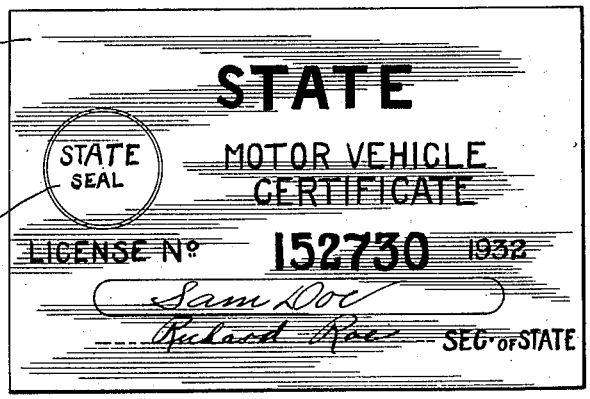
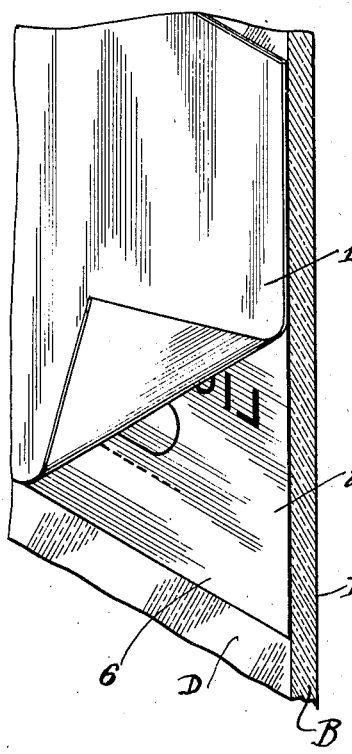
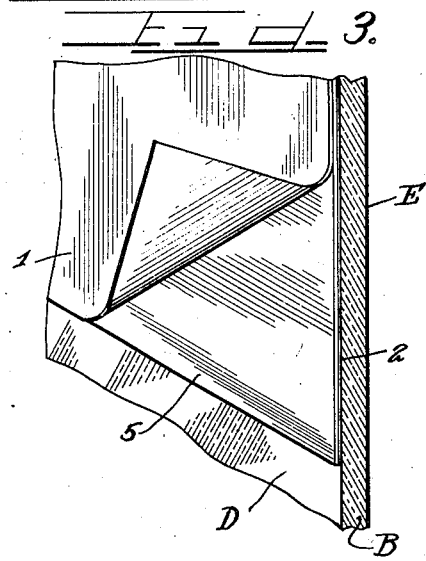
Inventor
Edward Galt.

Patented Apr. 2, 1935

1,996,288

UNITED STATES PATENT OFFICE 1,996,288

IDENTIFICATION DEVICE

Edward Galt, Ardmore, Okla.

Application September 15, 1932, Serial No. 633,225

6 Claims. (Cl. 41—33)

This invention has to do with means of identification, and relates more particularly to the identification of motor vehicle driving licenses and the like.

The need of some means of ascertaining at a glance the true ownership of a vehicle such as an automobile is very great, due in part to the appalling number of vehicle thefts which occur annually in every State and to the successful efforts of the dishonest in escaping vehicle tax payments. To enable a car owner to establish the fact that he has paid his vehicle tax as well as to provide a means for identifying the car itself, the State or municipality sends him a certificate identifying him and the car, and also one or a set of license plates which he is required to secure in conspicuous places to the car. The certificate bears a number agreeing with that on the plates, and the owner is required to show the certificate on demand of an officer or other person clothed with the proper authority, in order that such officer or other person may satisfy himself as to the bona fide ownership of the car.

Many car owners find it convenient to carry their license certificates on their persons, and it often happens that an owner will forget his certificate with the result that he is considerably embarrassed and inconvenienced when asked by an officer to present his certificate for identification purposes. Moreover, in the event a car is stolen, the thief can replace the license plates with a differently numbered set or a set from a different State and carry the corresponding certificate while driving the stolen car, so that no one will be the wiser. Also, a dishonest person having two cars of the same make or of different makes can by false statements obtain for a nominal fee duplicate license plates and certificate, which he applies to the second car, thereby defrauding the government of the vehicle tax for the second car. Cheating in a similar manner is often effected through collusion between owners of cars.

Such fraud and car theft can very effectively reduced or eliminated, with a consequent saving of millions of dollars to governments through assurance of collection of taxes whose payment has been heretofore successfully avoided, to individuals through a deterrent to car theft and through a substantial decrease in insurance costs, by the practice of the principles of the present invention. This invention has for one of its essential objects to provide a certificate of ownership to be attached in a conspicuous or prominent part of a car, preferably inside the same, in such a manner that it is tamperproof and will not suffer any alteration or removal without mutilation thereof.

It is another object of this invention to provide an identification certificate which may be applied to the windshield, instrument panel or other part of the dash or any other desirable part of an automobile or the like, so that the same may be readily visible and readable from the outside.

It is a further object of the invention to provide an identification certificate which may be applied to a windshield or the like by a decalcomania process and is of such construction that, although applied to the interior surface of the windshield, it will nevertheless be visible from the exterior of the windshield only or, if desired, from both inside and outside the car.

A further object of the invention contemplates the provision of a decalcomania certificate on the adhesive surface of which the identification data or intelligence is placed, the material having the adhesive surface being opaque and contrasting in color to the identification data, whereby the latter may be visible from one side only when the certificate is applied to a transparent support such as a windshield.

It is a still further object of the invention to provide a certificate of this character which is neat in appearance, may be made at a very low cost, and may be applied to its support by practically anyone.

In accordance with the general features of the invention, the identification certificate comprises the usual backing layer and the transfer layer bearing the design, the two layers being releasably united as one sheet by adhesion. The free surface of the transfer layer consists of a relatively strong adhesive material in order that said sheet may be transferred to a suitable support such as a windshield and the backing layer removed from the transfer layer in the practice of the art of decalcomania. The transfer layer in accordance with the present invention constitutes the certificate of ownership and bears certain data of identification including the number appearing on the license plate or plates. This data or intelligence is printed or otherwise suitably applied to the free surface of the transfer layer, which is then applied to the inner surface of the windshield, for example, so that the printing is clearly visible from the outside of the automobile and is hermetically sealed by the transfer layer from the inside and by the windshield from the outside. Thus any tampering with the data with a view to changing the same, as by changing the numeral "6" to the numeral "8", will result in a readily apparent mutilation of the certificate, so that apprehension of drivers of stolen vehicles is thereby greatly facilitated.

In accordance with another form of the invention, the transfer sheet is made of an opaque material in a color sufficiently contrasted with the identification data to be applied thereto so that the latter may be clearly discernible. With this construction, once the transfer sheet is transferred to the windshield or the like, from the inside of the car, it will be impossible to see the data except from the outside of the car, thereby making still more difficult if not impossible, any expert change in such data after the sheet is transferred.

In carrying out the invention in a still further form, the transfer layer is made transparent and the intelligence is placed on the free surface of this layer in reverse, i. e., reading backward, so that said layer may be attached to the instrument panel or other part of the dash and be visible to anyone whose gaze is directed to the panel or other part of the dash, as the case may be.

In another form, the data may be applied between the backing and transfer layers and on the latter, so that when the transfer layer is secured to the panel or the like, the data will be readily observable.

Other and further important objects of this invention will be apparent from the disclosures in the specification and the accompanying drawing.

This invention (in preferred forms) is illustrated in the drawing and hereinafter more fully described.

On the drawing:

Figure 1 is a fragmentary perspective view of the front of an automobile showing the invention applied to the windshield thereof.

Figure 2 is an enlarged fragmentary sectional view showing the construction of the device in accordance with one form of the invention, and the manner in which it is applied to the windshield or the like.

Figure 3 is a view similar to Figure 2 but showing a modified form of the invention.

Figure 4 is a front view of a certificate made in accordance with either form of the invention herein illustrated, showing how the identification data may appear on the transfer sheet.

As shown on the drawing:

Referring now more particularly to the drawing, the automobile A is shown provided with a windshield B to which the identification tag or certificate is attached in accordance with the principles of the present invention as shown at C. The identification device is shown for illustrative purposes only as consisting of two sheets as shown in Figure 2 and of three sheets in Figure 3. These two forms of the invention will now be described individually in detail.

Referring now more particularly to Figure 2, the invention comprises sheeting having any desirable shape such as a rectangle as shown in Figure 4 and comprising a removable backing strip or layer 1 and a transfer strip or layer 2. The transfer layer 2 bears any suitable design as for example one or a plurality of seals of a State of the Union, or of a municipality, as indicated at 3, and has printed on its adhesive surface 4 so that it may be read directly, any suitable identification data such as that shown in Figure 4, embodying the name of the State, the State automobile license number for the particular car to which the certificate is to be applied, the year and the names of the vehicle owner and the secretary of the State concerned. The transfer layer 2 is of transparent material.

The transfer layer 2 is transferred from the backing layer 1 to the inside surface D of the windshield B by decalcomania, the identification data being in waterproof ink, so that after the backing 1 is removed, said data is hermetically sealed from the inside by the gelatinous or like material of which the transfer sheet 2 is made, and from the outside by the windshield B or other support. Once the transfer layer 2 is applied to the windshield B, it is impossible to alter any of the data thereon or remove the layer without mutilating the same, and such mutilation will be readily recognizable.

The sheets embodying the various forms in which the invention may be practiced may be produced in large quantities at a very low cost of manufacture. The transfer layer 2 may be formed initially with any suitable design as above pointed out, and may be cut up into suitable shapes such as that shown in Figure 4, before or after the desired identifying data is printed on the free surface 4 bearing the adhesive material by which the layer 2 is to be permanently secured to the inner surface D of the windshield B or other suitable support.

In accordance with a further form of the invention as shown in Figure 3, the construction shown in Figure 2 is modified to the extent that an opaque layer 5 is applied permanently to the layer 2, so that when the layers 2 and 5 thus constituting the certificate are applied as a unit to the surface D of the support B and the backing layer 1 is removed, the identification data on the surface 4 of the layer 2 will be visible only from the outer side E of the support. It will thus be impossible to alter any of the data appearing on the surface 4 of the layer 2, since it will be impossible to see any part of such data from the inside of the car so that only guesswork could be employed to mutilate the transfer sheet comprising the layers 2 and 5 at the proper place to change for example a "3" to an "8", or a "0" to some other number. Moreover, any attempted alteration, whether successful or otherwise, or removal of the certificate from its support, will be accompanied by a readily detectable mutilation of the layers 2 and 5.

If desired, instead of employing a substantially transparent layer 2 and combining the same with an opaque layer 5, the transfer sheet may be made in one layer which is opaque, the identifying data being of course made in a contrasting color in any event so that the same is distinctly visible.

It will be understood that the certificate may be so constructed as to be visible from the inside of the car, as when the certificate is posted or secured to the instrument panel or other part of the dash or elsewhere. In such event, the data could be printed in reverse on the adhesive surface 4 of the layer 2, so that it would be directly readable from the other side when the layer is applied to its support. Or, the data could be printed on the back surface 6 of the transfer layer 2 to be readable directly. In such event it would be immaterial whether or not the transfer layer were opaque although, if opaque, it would of course contrast with the color of the data printed or written or otherwise applied thereon.

With this invention it will be evident from the foregoing that a motor car owner can comply with the laws of certain States and municipalities requiring posting of an identification certificate such as a certificate of ownership or tax payment receipt in a prominent or conspicuous place on the car so that the same may be readily seen from the outside thereof, such certificate being so attached that it cannot be removed or altered without mutilation which is readily detectable. When this invention is practiced, an officer can ascertain at a glance, regardless whether or not the car is occupied, if the number on the licence plate agrees with that on the certificate, and his suspicions will be aroused immediately should be detect any mutilation of the certificate or find that the certificate is not posted on the car. The loss of time and inconvenience due to an officer's stopping a car and making inquiries of the driver is eliminated by this invention. Moreover, an officer of a municipality, for example, can ascertain at a glance whether or not the vehicle tax has been paid and thus readily apprehend delinquent car owners, so that the collection of tax funds now avoided through fraud and otherwise may be assured.

This invention is thus effective as a deterrent of theft as well as tax payment delinquency and fraud, and when practiced universally will result in a very appreciable reduction in theft insurance rates.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In an ownership or identification means for an automotive vehicle carrying a license plate, a device of frangible material bearing thereon identifying indicia identical with that on the plate, said device being pasted to the windshield of the vehicle so as to present the indicia thereon for ready and easy observation through said windshield and at the same time protect such indicia from the elements and in a manner to prevent removal of said device without mutilation of the same.

2. In an ownership or identification means for a vehicle carrying a license plate so as to be readily seen from the outside of the vehicle, a device bearing indicia identical with that on the license plate and so formed and secured to the windshield of the vehicle as to be readily compared with the plate and defy change of any part or removal of the device from the windshield without mutilation of said device.

3. In an ownership or identification means for a vehicle carrying a license plate so as to be readily seen from the outside of the vehicle, a device bearing indicia identical with that on the plate and so formed and secured to the inside of the windshield of the vehicle as to be protected from the elements and readily compared with the plates and defy change of any part or removal of the device from the windshield without mutilation of said device.

4. In an ownership or identification means for a vehicle carrying a license plate so as to be readily seen from the outside of the vehicle, a device bearing indicia identical with that on the license plate and so formed and secured to the vehicle as to be readily compared visually with the plate and defy alteration of the indicia or removal of the device without mutilation of the device.

5. In an ownership or identification means for a vehicle carrying a license plate so as to be readily seen from the outside of the vehicle, a device bearing indicia identical with that on the license plate and so formed and secured to the vehicle as to be readily compared visually with the plate and defy alteration of the indicia or removal of the device without mutilation of the device, said device being mounted so as to be locked and yet visible from the outside of the vehicle when the vehicle is locked.

6. In an ownership or identification means for a vehicle carrying a license plate so as to be readily seen from the outside of the vehicle, a device carrying indicia identical with that on the license plate and so formed and secured to a transparent part of the vehicle as to be readily compared visually with the plate and defy alteration of the indicia or removal of the device without mutilation of the device.

EDWARD GALT.